(12) United States Patent
Klieber

(10) Patent No.: US 6,467,372 B2
(45) Date of Patent: Oct. 22, 2002

(54) BICYCLE STEERING DEVICE

(76) Inventor: Jochen Klieber, Dammweg 1, 83342 Tacherting (DE)

( * ) Notice: Subject to any disclaimer, the term of this patent is extended or adjusted under 35 U.S.C. 154(b) by 0 days.

(21) Appl. No.: 09/759,679

(22) Filed: Jan. 11, 2001

(65) Prior Publication Data

US 2001/0022115 A1 Sep. 20, 2001

Related U.S. Application Data

(63) Continuation-in-part of application No. 09/020,060, filed on Feb. 6, 1998, now abandoned, which is a continuation of application No. 08/708,050, filed on Aug. 30, 1996, now abandoned.

(30) Foreign Application Priority Data

Aug. 30, 1995 (DE) ........................................ 195 31 959

(51) Int. Cl.⁷ .............................................. B62K 21/12
(52) U.S. Cl. ..................................... 74/551.1; 74/551.8
(58) Field of Search ............................ 74/551.1–551.8; 280/261, 288.4, 281.1; D12/178

(56) References Cited

U.S. PATENT DOCUMENTS

| | | | | |
|---|---|---|---|---|
| 575,936 A | * | 1/1897 | Roso | 74/551.8 |
| D289,630 S | * | 5/1987 | Owens | D12/178 |
| 4,750,754 A | * | 6/1988 | Lennon | 74/551.1 |
| 4,903,542 A | * | 2/1990 | Borromeo | 74/551.8 |
| 5,145,210 A | * | 9/1992 | Lennon | 280/281.1 |
| 5,154,095 A | * | 10/1992 | Giard | 74/551.8 |
| 5,197,350 A | * | 3/1993 | Borromeo | 74/551.8 |
| 5,570,614 A | * | 11/1996 | Nastruccci | 74/551.1 |
| 6,035,741 A | * | 3/2000 | Krizman | 74/551.8 |
| 6,098,493 A | * | 8/2000 | Cortes | 74/551.8 |
| 6,234,043 B1 | * | 5/2001 | Marshall | 74/551.8 |

FOREIGN PATENT DOCUMENTS

| | | | | |
|---|---|---|---|---|
| CH | 101297 | * | 10/1923 | 74/551.1 |
| CH | 278827 | * | 10/1951 | 74/551.1 |
| FR | 638790 | * | 6/1928 | 74/551.1 |
| GB | 13053 | * | 7/1896 | 74/551.1 |
| GB | 25688 | * | 5/1906 | 74/551.1 |
| WO | WO 91/16231 | * | 10/1991 | 74/551.8 |

* cited by examiner

*Primary Examiner*—Vinh T. Luong
(74) *Attorney, Agent, or Firm*—Ohlandt, Greeley, Ruggeriero & Perle, LLP; George W. Rauchfuss, Jr.

(57) ABSTRACT

A steering device comprising of a one-piece T-shaped bar stem that is mounted to a head tube and that has two essentially parallel ends to which attachment clamps are mounted, each clamp holding the handlebar tube. The handlebar tube is arranged parallel to the bar stem's ends.

The wall thickness of the handlebar tube changes along the longitudinal axis of the handlebar tube. Within reinforcement areas, which serve to receive the attachment clamps, the wall thickness reaches its maximum. Within a first area of the handlebar tube having a constant outer diameter the wall thickness reaches its minimum. To prevent radial recesses within the handlebar tube, intermediate areas are formed, having an inner radius that increases in measure from a radius being equal to the inner radius of the first area to a radius being equal to the radius of the inner radius of the reinforcement area.

23 Claims, 8 Drawing Sheets

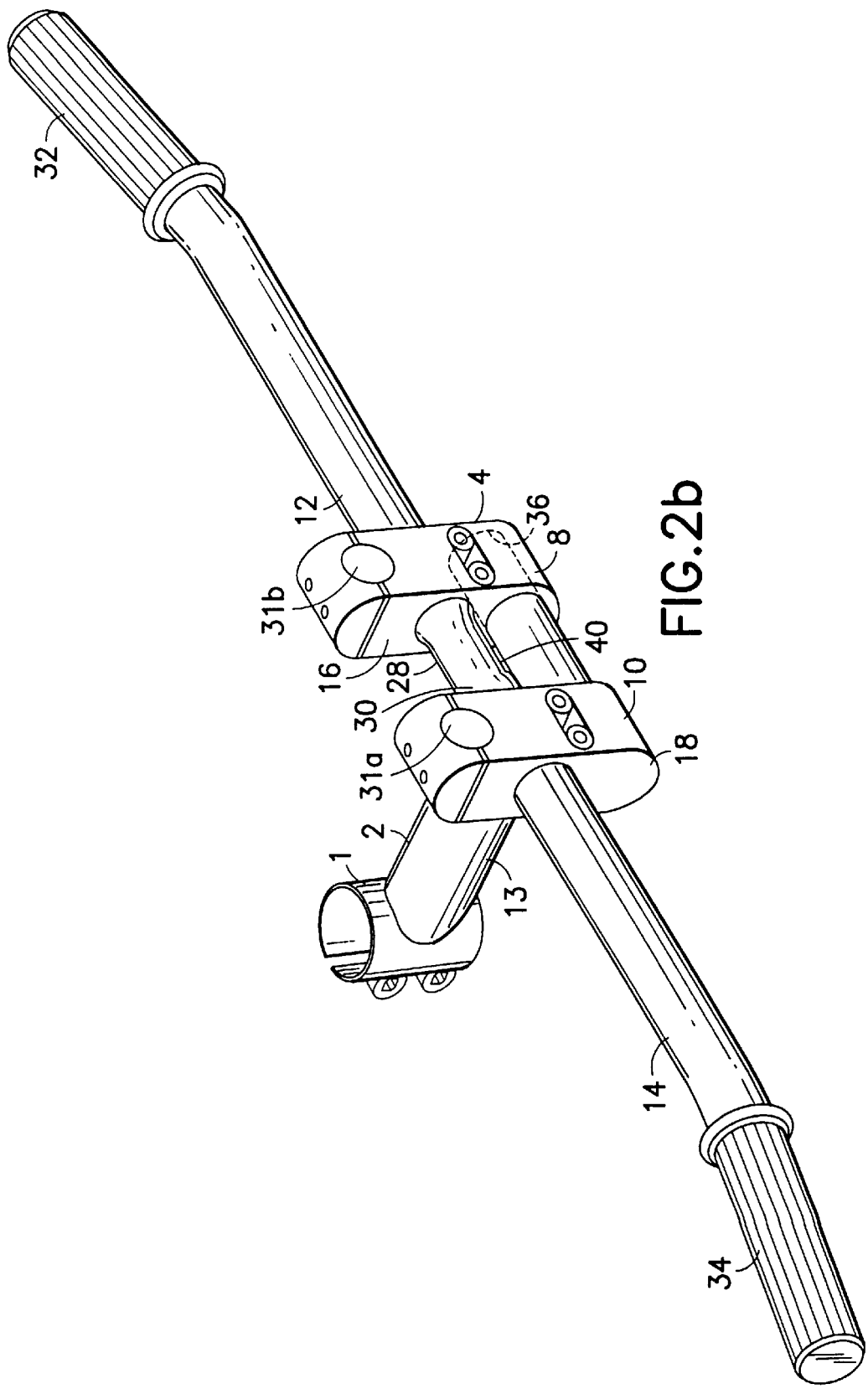

BICYCLE STEERING DEVICE

RELATED APPLICATIONS

This application is a continuation-in-part of application Ser. No. 09/020,060 filed Feb. 6, 1998, which is a continuation of application Ser. No. 08/708,050 filed Aug. 30, 1996, now abandoned.

FIELD OF THE INVENTION

The present invention relates to a steering device for use on a bicycle. Conventional steering devices are comprised of a bar stem attachable to a head tube and fitted with the basic handlebar.

DESCRIPTION OF THE PRIOR ART

The French document 1 554 438 discloses a configuration which is comprised of a stem bar having a tube-like sleeve for the insertion of the handlebar. The handlebar's ends are fitted with two bar ends providing the rider with a choice of hand positions. Since the stem tube holding the handlebar is rather short, under severe riding conditions, especially when pulling forces are applied to one side of the handlebar, the resulting bending stresses may cause the handlebar to fail from fatigue.

The U.S. Pat. No. 1,595,557 discloses a configuration which is comprised of a handlebar transversely mounted to the stem, the handlebar's ends being fitted with two inserts to which bar ends are pivotally attached. This configuration is not secure against early fatigue failure either.

The German patent application DE-OS 2 659 402 discloses a handlebar having two pivoting grip elements. This configuration also fails to be secure against fatigue failure.

The documents U.S. Pat. No. 5,145,210, U.S. Pat. No. 5,197,350, U.S. Pat. No. 4,750,754, U.S. Pat. No. 5,154,095, WO 91/16231, GB 13 053, and CH 278 827 show clamps for use in a steering device, which can receive two tubes in directions perpendicular to each other. The devices disclosed in these documents fail to be secure against fatigue failure.

The U.S. Pat. No. 289,630 discloses a dual tube clamp for use in a steering device, by which two parallel tubes are receivable. The tubes can be fixed by means of two screws arranged on an axis that is perpendicular to the longitudinal axis of the tubes. One tube is arranged between these screws. This device fails to be secure against fatigue failure.

Document FR 638 790 also shows a dual tube clamp for fixing parallely arranged tubes. The clamp consists of two single parts which are mirror-imaged. A screw being arranged between the two tubes fixes the tubes between these parts. The screw extends in direction perpendicular to the mirror axis and to the tubes' axis with its longitudinal axis. This device also fails to be secure against fatigue failure.

Document CH 101 297 shows a steering device with a clamp for receiving two parallel tubes. Each of the tubes is fixed by means of one screw, the screws being different from each other. This device also fails to be secure against fatigue failure.

The U.S. Pat. No. 5,570,614 discloses a steering device comprising two half handlebar tubes. Each of these half handlebar tubes is received by a bore of a double tube clamp. One screw fixes the half handlebar tubes within the double tube clamp. The bores of the handlebar tubes are arranged parallely to each other. This device also fails to be secure against fatigue failure.

U.S. Pat. No. 4,903,542 shows a steering device with scale marks on the circumference of a handlebar tube. However, this device also fails to be secure against fatigue failure. Moreover, it is state of the art as shown in FIG. 1 to provide a handlebar transversely installed in a stem with socket at both ends which themselves serve to hold handlebar tubes. This configuration likewise consists of a handlebar being clamped in the stem, and as a result is likely to fail from fatigue. By using extremely wide clamps, the inherent problem can be diminished, but not solved.

Besides, especially wide bar stem clamps are clumsy and an offense to the eye. Another problem arises from the fact that the rider wants to match different types of bar stems and handlebars of a certain size in order to meet his specific needs. With poorly matched components there is always the risk of reduced fatigue resistance. When combining a sharp-edge steel stem with a thin-walled handlebar, the danger of early fatigue failure is increased, even more so if it is an aluminum handlebar.

Therefore, it is the intent of the present invention to provide a bicycle steering device the use of which will help to noticeably reduce the danger of early handlebar fatigue failure as compared to conventional handlebar configurations.

SUMMARY OF THE INVENTION

In accordance with the present invention, the bicycle steering device is comprised of a one-piece T-shaped bar stem attachable to a head tube, having two opposite ends, each end being designed to be fitted with a clamp, the two clamps being used to firmly hold a handlebar tube.

The steering device in accordance with the present invention is considerably more secure against fatigue failure, since the handlebar tube is directly coupled to the bar stem by means of clamps. Adapters subject to wear and fracture are eliminated. In addition, steering precision is improved over conventional configurations. Furthermore, the common mistake of using a poorly matched handlebar/stem combination is prevented, as the conventional handlebar center section clamped in the bar stem is deleted. The embodiment in accordance with the present invention has increased flexural rigidity and can be adjusted to meet ergonomic requirements.

In a favorable embodiment the T-shaped bar stem comprises a third end to which a further clamp is mounted with its first end. The second end of the clamp is fixed at a head tube comprised by a bicycle.

In a favorable embodiment of the present invention the two ends of the bar stem are essentially parallel, and the handlebar tube is straight. Thus, the two ends of the one-piece T-shaped bar stem are assumed to lie on a straight line, the same is assumed for the handlebar tube.

The handlebar tube is fastened essentially parallel to the stem's end sections. This results in improved rigidity and steering precision.

The wall thickness of the handlebar tube according to the invention changes along the longitudinal axis of the handlebar tube, wherein the wall thickness is defined by the difference between an outer radius and an inner radius of the handlebar tube. The inner radius is equal to the distance between the longitudinal axis of the handlebar tube and the inner surface of the handlebar tube and the outer radius is equal to the distance between the longitudinal axis of the handlebar tube and the outer surface of the handlebar.

The handlebar tube of the invention exhibits at least one reinforcement area. This reinforcement area is designed such that the wall thickness of the handlebar tube, which changes along its longitudinal axis, reaches its maximum. The reinforcement areas serve to hold the handlebar tube or the attachment clamps, respectively. Thus, each of the attachment clamps id fixed within a reinforcement area.

A favorable embodiment of the attachment clamp in accordance with the present invention is a socket clamp designed to receive two tubes. It is comprised of two clamp sections, their longitudinal axes being parallel. This type of dual tube clamp costs less to manufacture and saves material.

In a favorable embodiment each of the clamps has two front sides with an outer area. This adds to strength and rigidity.

In a favorable embodiment all clamp sections incorporate one slot each which enables adequate and simultaneous clamping of the two tubes. The attachment clamp comprises one slot and can be clamped by a clamping means so that the width of the slot will be decreased independently from each other when the clamp is fastened. This has the advantage that the fastening of both tubes is possible, if there are minor variances in the diameters of different handlebars or bar stems which can result in industrial production. There are at least one open and one closed position of the clamps wherein in the open position the width of the slot is greater than in the closed position.

In another preferred embodiment the attachment clamp comprise two openings which coincide with the slots of the clamp sections. Also in this embodiment the clamp sections can be fastened by the use of just one clamping means under the advantages mentioned above.

In a favorable embodiment the clamping means mentioned above is realized by threaded holes for the insertion of a clamping bolt which serves to press together the two clamping sections by decreasing the width of the two slots.

The clamping bolts are preferably coarse pitch threaded in order to increase the clamping effect. Special preference is given to fine pitch clamping bolts with rather flat groove in order to maintain self releasing torque below a threshold that might permit handlebars to work loose.

The axial length of the dual clamps is between 2 and 20 cm, preferably 2 and 10 cm. These dimensions are preferably chosen in order to improve flexural rigidity.

In a further favorable embodiment the handlebar tube exhibits at least three types of areas along its longitudinal axis. These types differ in wall thickness. The areas of the first type, the so-called first areas, are constant in wall thickness as well as the areas of the second type are. The areas of the second type are so-called reinforcement areas. These areas serve to increase stability of the handlebar tube. Consequently, the handlebar tube's wall thickness reaches its maximum within at least one of the reinforcement areas. The minimum wall thickness is reached within at least one of the first areas. Between each first area and each of the reinforcement areas having the smallest distance to the first area in the directions along the longitudinal axis an intermediate area are formed. Thus, each of the intermediate areas is adjacent to exactly one first area and exactly one reinforcement area. The intermediate areas being of the third type of areas show a wall thickness increasing along the longitudinal axis. At one end of the intermediate area this wall thickness adapts the wall thickness of the first area, at the other end it adapts the wall thickness of the reinforcement area. Each type of areas can occur several times along the longitudinal axis.

In a favorable embodiment of the invention the outer surface of the handlebar tube is constant in diameter.

A favorable embodiment shows intermediate areas being shaped conically.

A favorable handlebar tube comprises two reinforcement areas between which a first area is formed. An attachment clamp is arranged within each of the reinforcement areas.

A further favorable handlebar tube has two end areas both of them being formed as a first area.

The clamp section to receive the bar stem is provided with a shoulder which serves to hold one end of the bar stem tightly in position. This again will improve flexural rigidity.

For a favorable embodiment scale graduation marks are provided on the bar stem, the bar clamps and/or the handlebar tubes in order to facilitate adjustment.

For a further favorable embodiment scale graduation marks are provided on the bar clamps in order to facilitate adjustment.

For further favorable embodiment of the invention scale graduation marks are provided on the handlebar tubes in order to facilitate adjustment.

A favorable embodiment of the handlebar tube is provided with a radial recess on its outer surface. The recess serves for holding accessories, in particular, operating devices. The recess extents from the middle of the handlebar tube being mirror-imaged. Apart from this, this recess the handlebar tube is constant in outer diameter.

For another favorable embodiment the handlebar tube 12 is provided with a radial recess to allow accessories, in particular, operating and control devices to be fastened.

BRIEF DESCRIPTION OF THE DRAWINGS

The disclosures of the present invention are further described and depicted by the following figures.

FIG. 2b discloses a perspective view of an embodiment of a steering device in accordance with the present invention.

FIG. 5e discloses a slider which can be used in the clamp of FIG. 5a.

DETAILED DESCRIPTION OF THE PREFERRED EMBODIMENTS

Figure 1:
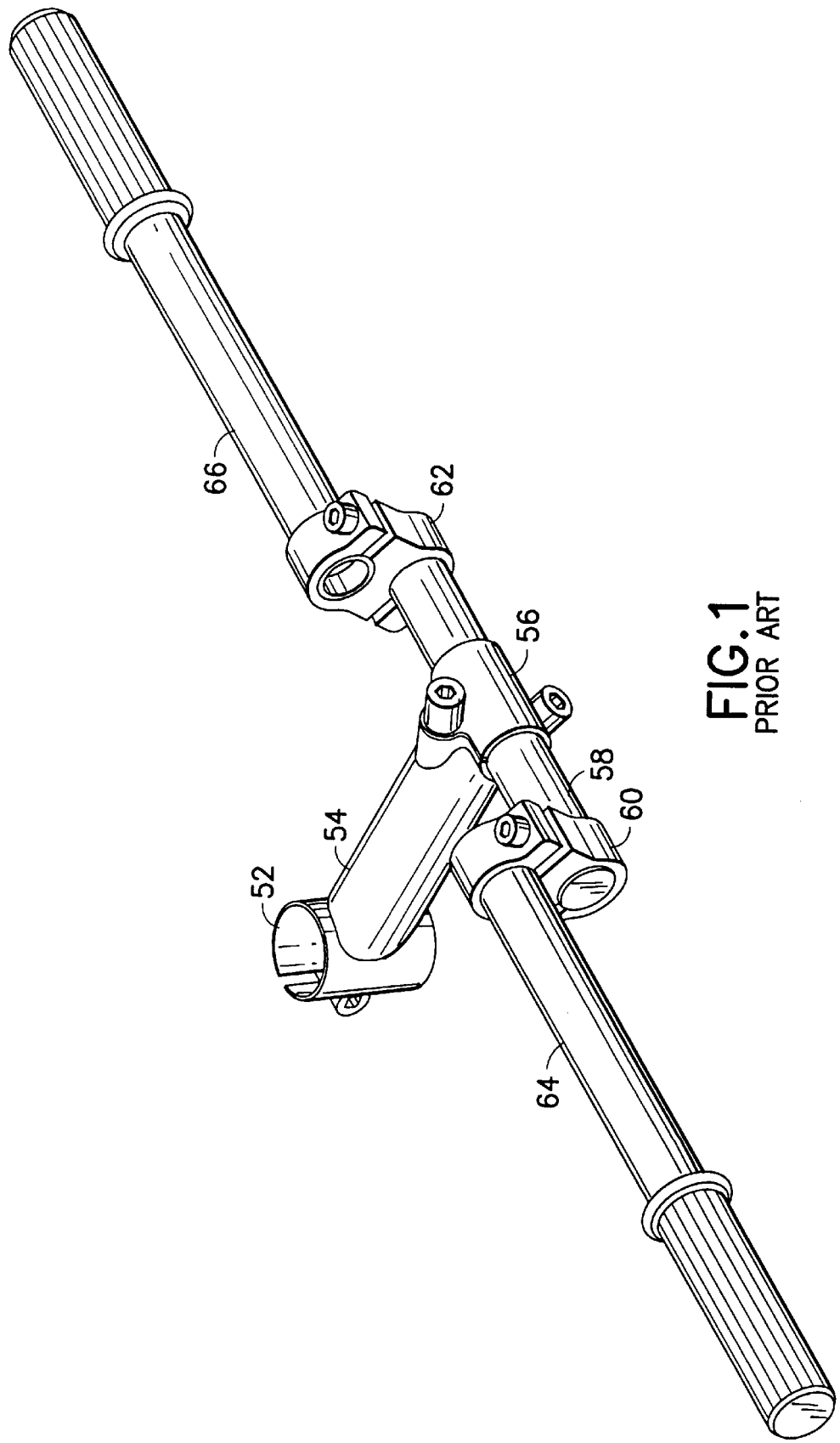
FIG. 1 discloses a view of an embodiment of a steering device in accordance with the state of the art.
Figure 2A:
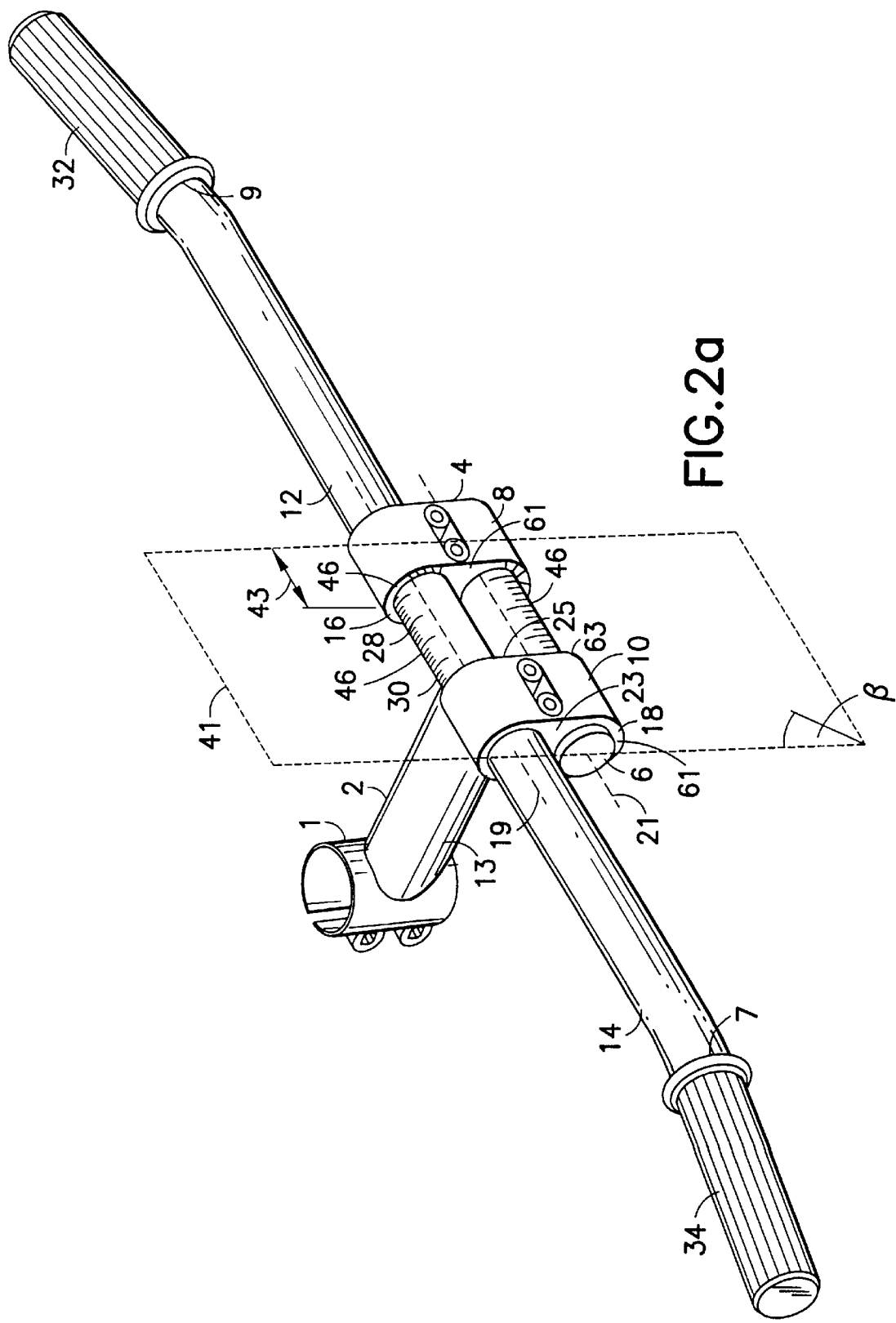
FIG. 2a discloses a perspective view of an embodiment of a steering device in accordance with the present invention.

The steering device shown in FIGS. 2a to 5e being an embodiment in accordance with the present invention is comprised of a one-piece T-shaped bar stem 2 made of titanium alloy which at one end—at the third end 13—can be mounted to a head tube 15 by means of clamp 1. Bar stem 2 has two ends 4 and 6 which are essentially parallel. Mounted to ends 4 an 6 are attachment clamps 8 and 10, each clamp 8 or 10 holding the handlebar tube 12 which is inserted in the clamp 2 and fixed in position. The handlebar tube 12, 14 is straight and has rubber grips 32, 34 at their ends 7, 11.

A handlebar tube (12) shown in FIG. 2b is provided with a radial recess 40 for fastening accessories not shown, in particular, operating devices.

Figure 3A:
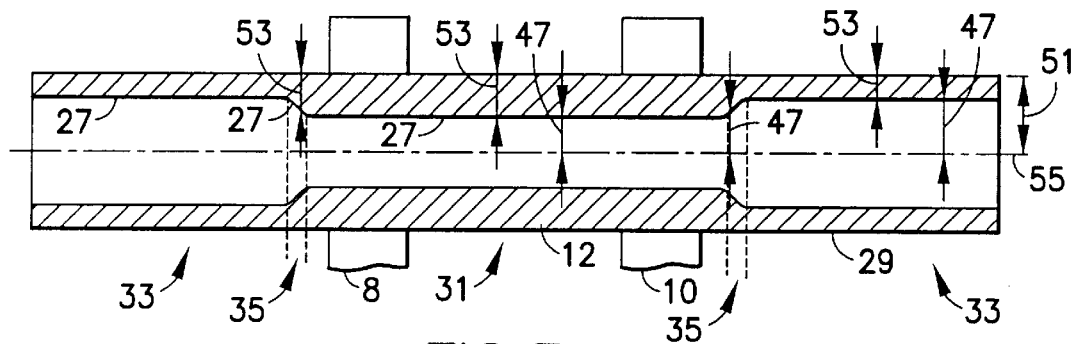
FIG. 3a discloses a handlebar tube in accordance with the present invention.
Figure 3B:
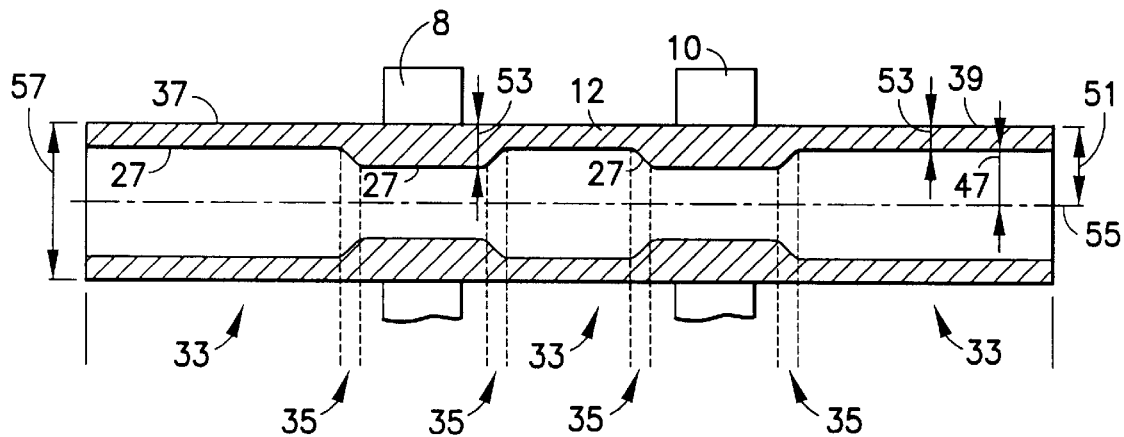
FIG. 3b discloses a handlebar tube in accordance with the present invention.
Figure 4A:
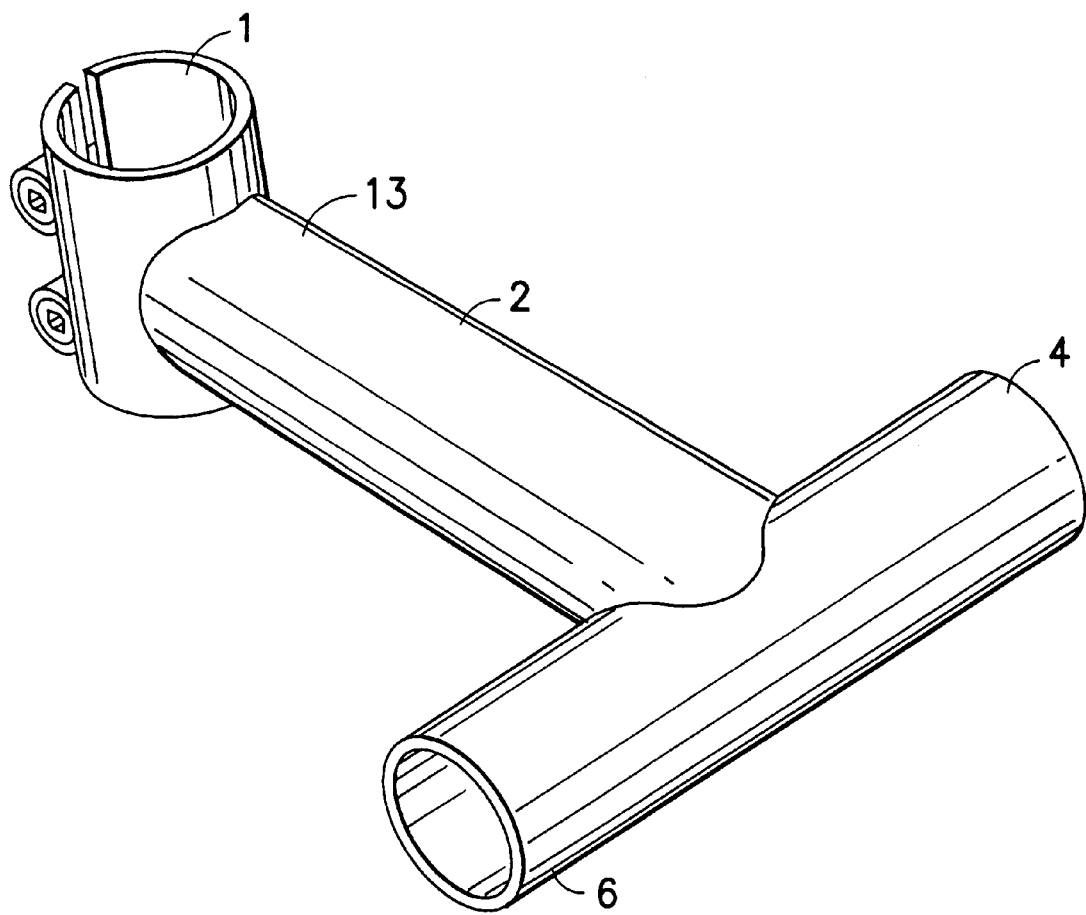
FIG. 4a discloses a T-shaped bar stem in accordance with the present invention.
Figure 4B:
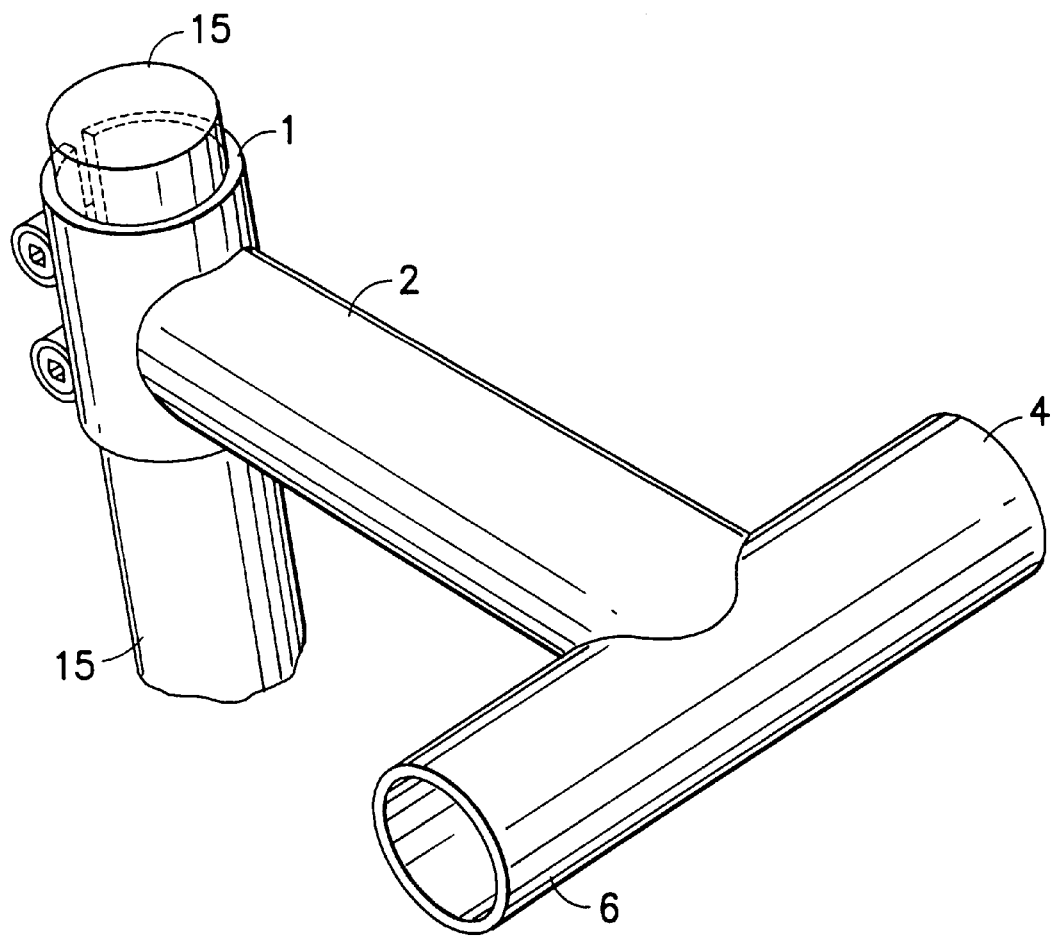
FIG. 4b discloses a T-shaped bar stem and a head tube of a bicycle in accordance with the present invention.

As shown in FIG. 3a and 3b, the wall thickness 53 of the handlebar tube 12 changes along the longitudinal axis 55 of the handlebar tube 12.

For the purpose of stability, there are formed reinforcement areas 31 along the longitudinal axis 55, which serves to hold the attachment clamps 8, 10. Within at least one of these reinforcement areas 31 the wall thickness 53 of the handlebar tube 12 reaches its maximum.

Furthermore, some first areas 33 are formed along the longitudinal axis 55. These first areas 33 having smaller wall thickness 53 than the reinforcement areas 31 are formed along the longitudinal axis 55. The first areas 33 coincides with such areas of the handlebar tube 12, within which the danger of early handlebar fatigue failure is low.

The outer diameter 57 of the handlebar tube 12 is constant, and, thus, the inner diameter of the handlebar tube is lower within the first area 33 than within the reinforcement area 31.

To prevent recesses within in handlebar tube 12, intermediate areas 35 are formed between the first areas 33 and the reinforcement areas 31. These reinforcement areas 31 show a wall thickness 53 continuously increasing such that recesses are prevented.

Therefore, the end of the intermediate area 35, which abuts the first area 33, shows the same inner radius 47 of the handlebar tube 12 as the end of this first area 33 abutting aforementioned intermediate area 35. Correspondingly, the ends of intermediate area 35 and the adjacent reinforcement areas 31 are identical with respect to the handlebar tube's 12 inner radius 47.

The intermediate areas 35 are favorably shaped conically with respect to their inner surface 27. However, the transition areas to the first area 33 or the reinforcement area 31, respectively, are formed as bent curves with respect to the inner surface 27 of the handlebar tube 12 in axial direction. These curves are such that inner radius 47 within the transition area slightly adapts to the inner radius 47 of the first area 33 or the reinforcement area 31, respectively. The bent curve may be formed as a section of a circle.

The transition areas are the end areas of the reinforcement area 31. The length of the transition areas in direction of the longitudinal axis 55 of the handlebar tube measures 1 cm, or 0.7 cm, or 0.5 cm, or 0.4 cm, or 0.3 cm, or 0.2 cm, or 0.1 cm, for example.

Figure 5A:
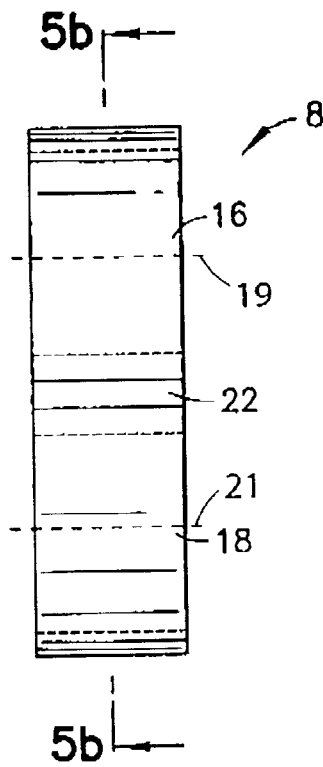
FIG. 5a discloses a side view of a first embodiment of the clamp in accordance with the present invention.
Figure 5B:
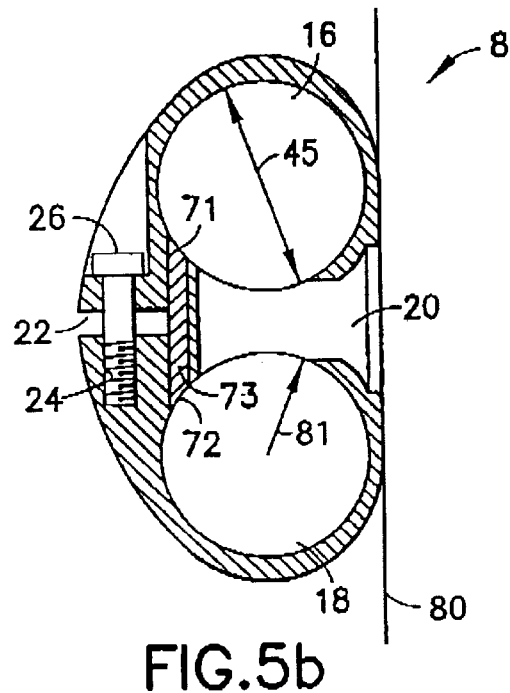
FIG. 5b discloses a cross-sectional view of the clamp of FIG. 5a along the line 5b-5b.
Figure 5C:
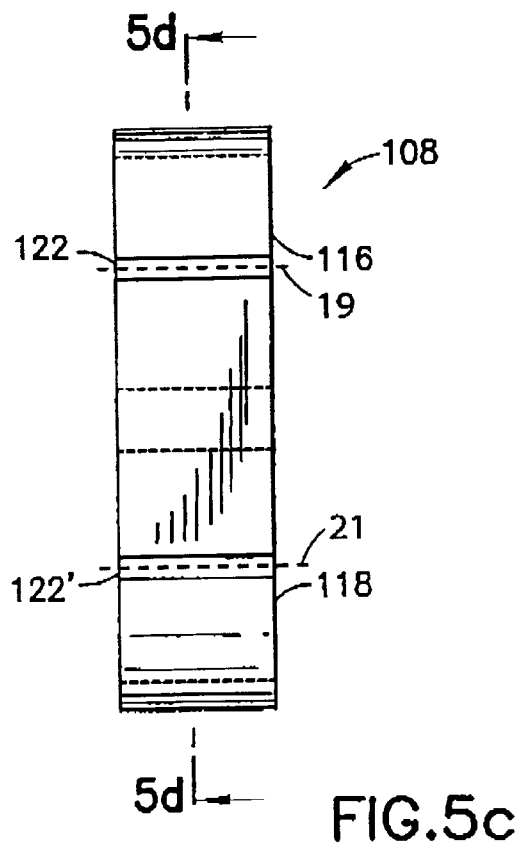
FIG. 5c c discloses a side view of a second embodiment of the clamp in accordance with the present invention.
Figure 5D:
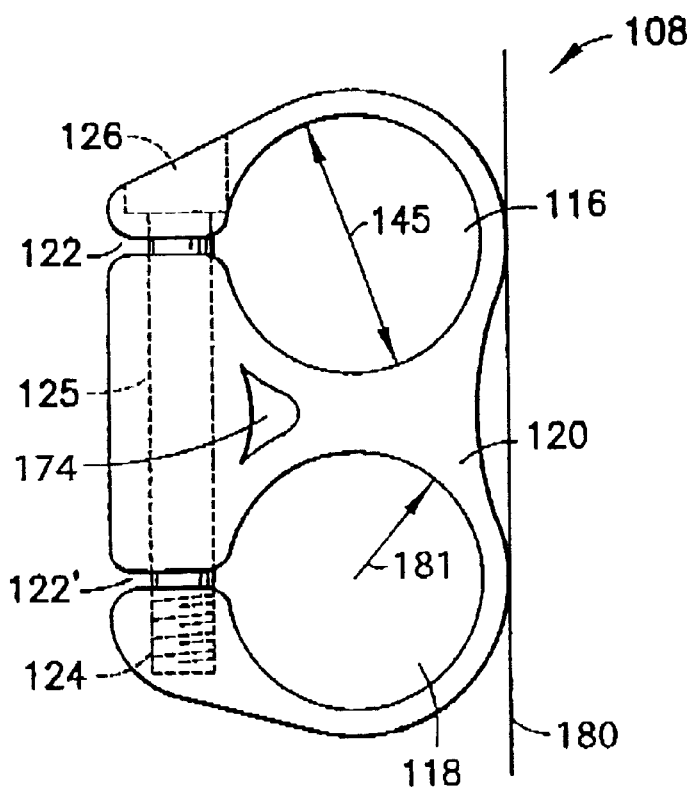
FIG. 5d discloses a cross-sectional; view of the clamp of FIG. 5c along line 5d-5d.

Attachment clamp 8 shown in FIGS. 5a, 5d, discloses an upper, first clamp section 16 for insertion of a first bar, in particular the handlebar tube 12 and a lower, second clamp section 18 having a larger diameter 45a to receive the second bar, in particular stem 2.

The first axis 19 ofd said first bar and the second axis 21 of the second bar are substantially parallel. Furthermore, as shown in FIG. 5b, the first axis 19 and the second axis 21 are substantially perpendicular to a plane which is defined by a tangent line 80 to the outer contours of said first clamp section and said second clamp section and the radial direction 81 of the clamp sections.

The two clamp sections comprise openings 71 and 72. The diameter for the clamp section 16 and the clamp section 18 can be selected differently.

Figure 5E:
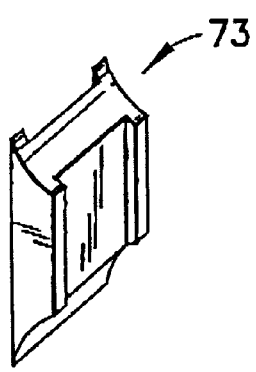
Figure 5F:
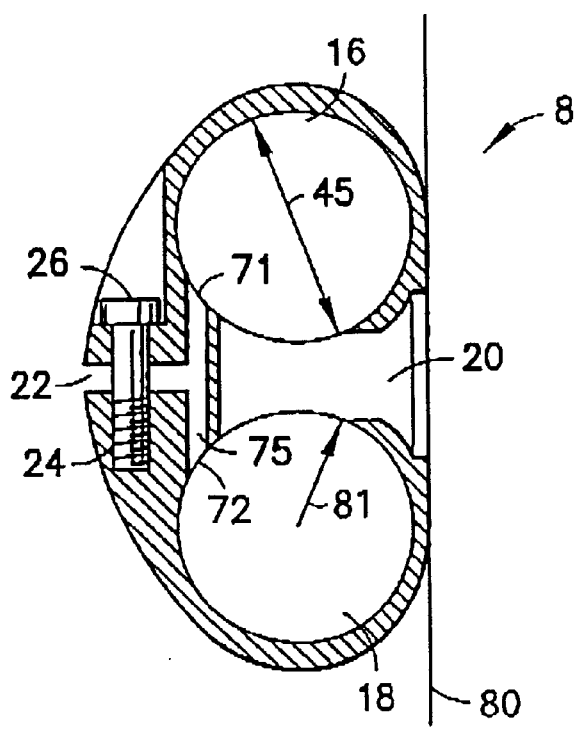
FIG. 5f discloses a cross-sectional view of the clamp of FIG. 5a along the lined 5b-5b without the slider shown in FIG. 5e.

A spacing 20 joins the two clamp section 16 and 18. As shown in FIG. 5f, the latter incorporates a flat slot 75, which connects the internal openings 71 and 72 of clamp section 16 and 18. Slot 75 is substantially parallel to a tangent line 80 to the outer contours of said first clamp section and said second clamp section.

In addition, perpendicular to its longitudinal axis 19, 21, attachment clamp 8 are provided with a hole 24 into which a clamping bolt 26 is inserted. The clamping bolt 26 enables simultaneous but independent clamping of the two clamp sections 16 and 18. Very preferably a female hexagonal screw can be used as bolt. A slot 22 is provided substantially perpendicular to the tangent line mentioned above which enables a uniform clamping. A slider 73 which has substantially H-shape and which is adapted to substantially fill out the cutout 75 can be used to laterally stabilize the clamp. FIG. 5e shows the slider according to the invention. The slider 73 enables a one-piece manufacturing of the clamp.

Preferably the slider consists of solid material like metal or synthetic resin, preferably of light metal and very preferably of aluminum, an aluminum-titan alloy or fiber-hardened resin.

The attachment clamp 8 can be clamped by a clamping means by changing, in particular narrowing the width of said slot 22 perpendicular to said tangent line 80 to fasten said first bar and said second bar which enables to fasten both bars substantially independent from each other.

Another preferred embodiment of an attachment clamp is shown in FIGS. 5c, d. FIG. 5c discloses an upper, first clamp section 116 for insertion of a first bar. In particular the handlebar tube 12 and a lower, second clamp section 118 having a diameter 145 to receive a second bar, in particular the bar stem 2.

The first axis 19 of said first bar and the second axis 21 of said second bar are substantially parallel. Furthermore, as shown in FIG. 5d, the first axis 19 and the second axis 21 are substantially perpendicular to a plane which is defined by a tangent line 180 to the outer contours of said first clamp section and said second clamp section, and the radial direction of the clamp sections.

The diameter for the clamp section 116 and the clamp section 118 can be selected differently. The two clamp sections 116 and 118 are joined by a spacing 120. The attachment clamp 108 comprises two slots 122 and 122', which are substantially perpendicular to a tangent line 180 to the outer contours of said first clamp section and said second clamp section.

The first clamp section 116 and the second clamp section 118 comprise one opening each which coincide with the first and the second slot 122 and 122'.

In addition, perpendicular to its longitudinal axis 19, 21, attachment clamp 8 is provided with holes 124 and 125 into which a clamping bolt 126 is inserted. The clamping bolt 126 enables simultaneous but independent clamping of the two clamp sections 116 and 118.

The attachment clamp 108 can be clamped by a clamping means by changing the width of said first slot 122 and said second slot 122' and thereby clamps said first bar and said second bar in the attachment clamp which enables to fasten both bars substantially independent from each other.

The attachment clamps 8 and 108 may provide cutouts 174 in order to save weight.

Preferably the attachment clamps 8 and 108 consist of solid material like metal or synthetic resin, preferably of light metal and very preferably of aluminum, an aluminum-titan alloy or fiber-hardened resin.

Preferably the clams 8 and 108 have two front sides 23, 25 each of them being perpendicular to the longitudinal axis 19, 21.

The bicycle steering device in accordance with the present invention is especially intended for use with and/or for converting an AHEADSET™ configuration, the head tube of which is secured by the stem, but is unsatisfactory both in appearance and safety features. By reversing the steering device by 180 degrees, vertical adjustment of an AHEADSET™ mounted handlebar is achieved. However, a continuously variable adjustment is not possible.

The dual tube clamps can be provided with additional holes 31a, 31b for mounting aerobars and/or triathlon bars. For this purpose, contiguous surfaces will be provided to facilitate installation of triathlon clip-ons, computers, lamps, bags, and the like.

The handlebar tubes 12 which are removable from the dual tube clamps 8, 10.

When using the steering device in accordance with the present invention, the bar stem angle β can be chosen so that, by reversing the attachment clamps 8, 10 by 180 degrees and turning them upside down, a height change of only half the center to center distance of tubes will occur.

What is claimed is:

1. A steering device comprising
   a one-piece T-shaped bar stem (2), having opposite ends (4, 6), to each of said ends at least one attachment clamp (8, 10) is fastened, the attachment clamps (8, 10) fixing in position a handlebar tube (12), wherein
   the handlebar tube (12) has an inner circular surface (27) with an inner radius (47) and an outer circular surface (29) with an outer radius (51), the difference of which determines the wall thickness (53) of the handlebar tube (12) and the wall thickness (53) changes along the longitudinal axis (55) of the handlebar tube (12),
   the handlebar tube (12) exhibits at least one reinforcement area (31) being reinforced such that the wall thickness (53) is maximum, and
   each of the attachment clamps (8, 10) fixes the handlebar tube (12) within a reinforcement area (31).

2. A steering device of claim 1 wherein
   the T-shaped bar stem (2) comprises a third end (13) to which a clamp (1) is mounted, the clamp (1) being fixed to a head tube (15) of a bicycle.

3. A steering device of claim 1 wherein
   the two ends (4, 6) are parallel, and the handlebar tube (12) is straight.

4. A steering device of claim 1 wherein
   the handlebar tube (12), is secured parallel to the bar stem's ends (4, 6).

5. A steering device of claim 1 wherein
   the handlebar tube (12) exhibits at least one first area (33), at least one intermediate area (35), and at least one reinforcement area (31), each of the intermediate areas (35) being adjacent to exactly one first area (33) and to exactly one reinforcement area (31) and these areas (31, 33, 35) being different in wall thickness (53) such that the wall thickness (53) of the first area (33) is the smallest one and constant, the wall thickness (53) of the reinforcement area (31) is the largest one and constant, and the wall thickness (53) of the intermediate area (35) continuously increases in such a way that the wall thickness (53) of the first area (33) is continuously adapted to the wall thickness (53) of the reinforcement area (31).

6. A steering device of claim 5 wherein
   the outer circular surface (29) of the handlebar tube (12) is constant in diameter (57).

7. A steering device of claim 5 wherein
   the inner circular surface (27) of the handlebar tube (12) is conically shaped within the intermediate area (35).

8. A steering device of claim 1 wherein
   two attachment clamps (8, 10) fixes the handlebar tube (12), each of them within a reinforcement area (31), the reinforcement areas (31) being different from each other such that at least one first area (33) is formed between these reinforcement areas (31).

9. A steering device of claim 8 wherein
   the handlebar tube (12) has two end areas (37, 39) each of these end areas (37, 39) coinciding with a first area (33).

10. A steering device in accordance with claim 1 wherein
    scale marks (46) are provided on the bar stem (2) for adjustment.

11. A steering device in accordance with claim 1 wherein
    scale marks (46) are provided on the attachment clamps (8, 10) for adjustment.

12. A steering device in accordance with claim 1 wherein
    scale marks (46) are provided on the handlebar tube (12) for adjustment.

13. A steering device in accordance with claim 1 wherein
    the handlebar tube (12) is provided with a radial recess for fastening accessories.

14. An attachment clamp for a steering device for bicycles comprising:
    at least one first clamp section (16) for fastening at least one first bar comprising a handlebar tube (12) substantially extending along a first axis (19),
    at least one second clamp section (18) for fastening at least one second bar comprising a bar stem (2) substantially extending along a second axis (21),
    the first axis (19) and the second axis (21) are substantially parallel to each other,
    the first axis (19) and the second axis (21) are perpendicular to a plane which is defined by a tangent line (80) to the outer contours of said first clamp section (16) and said second clamp section (18) and the radial direction (81) of said clamp sections,
    the attachment clamp comprises a slot extending from said first clamp section to said second clamp section, which is substantially parallel to said tangent line to the outer contours of said first clamp section and said second clamp section,
    the attachment clamp comprises a second slot, which is substantially perpendicular to said tangent line to the outer contours of said first clamp section and said second clamp section,
    the attachment clamp is clamped by a clamping means by changing the width of said slot perpendicular to said tangent line to the outer contours of said first clamp section and said second clamp section to fasten said first bar and said second bar, which enables both bars to be fastened substantially independent from each other.

15. An attachment clamp according to claim 14 is wherein the clamping means is a clamping bolt inserted in a threaded hole provided in the clamp.

16. A clamp according to claim 14 wherein the axial length (43) of the clamp is 2 to 20 cm.

17. A clamp according to claim 14 wherein the second clamp section (18) to receive the bar stem (2) is larger in diameter (45) than the clamp section (16) to receive the handlebar tube (12).

18. An attachment clamp according to claim 14 wherein the clamp comprises a slider adapted to substantially fill out the cutout is provided to stabilize the clamp in radial direction.

19. An attachment clamp according to claim 14 wherein the second clamp section (18) to receive the bar stem (2) is provided with a shoulder (36) against which one end (4,6) of the bar stem (2) is fixed in position.

20. An attachment clamp for a steering device for bicycles comprising:
- at least one first clamp section (116) for fastening at least one first bar comprising a handlebar tube (12) substantially extending along a first axis (19),
- at least one second clamp section (118) for fastening at least one second bar comprising a bar stem (2) substantially extending along a second axis,
- the first axis (19) and the second axis (21) are substantially parallel to each other,
- the first axis (19) and the second axis (21) are perpendicular to a plane which is defined by a tangent line (180) to the outer contours of said first clamp section (116) and said second clamp section (118) and the radial direction (181) of said clamp sections,
- the attachment clamp comprises a first slot (122) and a second slot (122') wherein both slots substantially are perpendicular to said tangent line to the outer contours of said first clamp section and said second clamp section,
- said first clamp section and said second clamp section comprise openings which coincide with said first and second slot in the attachment clamp,
- the attachment clamp is clamped by a clamping means by changing the width of said first slot and said second slot and thereby clamps said first bar and said second bar in the attachment clamp, which enables both bars to be fastened substantially independent from each other.

21. An attachment clamp according to claim 20 wherein the clamping means is a clamping bolt inserted in a threaded hole provided in the clamp.

22. A clamp according to claim 20 wherein the axial length (43) of the clamp is 2 to 20 cm.

23. A clamp according to claim 20 wherein the second clamp section (118) to receive the bar stem (2) is larger or smaller in diameter (45) than the first clamp section (116) to receive the handlebar tube (12).

* * * * *